United States Patent [19]
Takizawa et al.

[11] Patent Number: 5,861,182
[45] Date of Patent: Jan. 19, 1999

[54] PREPLASTICIZING INJECTION APPARATUS

[75] Inventors: Kiyoto Takizawa; Hisato Shimizu, both of Hanishina-gun, Japan

[73] Assignee: Nissei Plastic Industrial Co., Ltd., Nagano-ken, Japan

[21] Appl. No.: 850,443

[22] Filed: May 5, 1997

Related U.S. Application Data

[63] Continuation of Ser. No. 405,349, Mar. 16, 1995, abandoned.

[30] Foreign Application Priority Data

| Mar. 18, 1994 | [JP] | Japan | 6-072928 |
| Dec. 29, 1994 | [JP] | Japan | 6-338816 |
| Dec. 29, 1994 | [JP] | Japan | 6-338819 |

[51] Int. Cl.$^6$ .................................................. B29C 45/54
[52] U.S. Cl. .......................... 425/557; 425/559; 425/561
[58] Field of Search .................................. 425/205, 203, 425/544, 546, DIG. 228, 585, 587, 586, 550, 378.1, DIG. 13, 557, 559, 561; 249/78; 366/146, 149

[56] References Cited

U.S. PATENT DOCUMENTS

| 3,080,610 | 3/1963 | Baigent . | |
| 3,218,375 | 11/1965 | Hardwick | 264/45 |
| 3,727,678 | 4/1973 | Schott | 165/64 |
| 4,390,332 | 6/1983 | Hendry | 425/572 |
| 4,443,178 | 4/1984 | Fujita | 425/564 |
| 4,600,375 | 7/1986 | Honsho et al. | 425/585 |

(List continued on next page.)

FOREIGN PATENT DOCUMENTS

| 0293756 | 12/1988 | European Pat. Off. . |
| 2021652 | 7/1970 | France . |

(List continued on next page.)

OTHER PUBLICATIONS

Patent Abstracts of Japan, vol. 6, No. 190, (M–159), Sep. 29, 1982 & JP–A–57 098330 (Matsuda Seisakusho:KK), Jun. 18, 1982.
Patent Abstracts of Japan, vol. 10, No. 222, (M–504), Aug. 2, 1986, & JP–A–61 058714 (AIDA Eng. Ltd.), Mar. 26, 1986.
Patent Abstracts of Japan, vol. 15, No. 279, (M–1136), Jul. 16, 1991, & JP–A–03 097518 (Sodick Co. Ltd.), Apr. 23, 1991.
Patent Abstracts of Japan, vol. 15, No. 171 (M–1108), Apr. 30, 1991, & JP–A–03 036010 (Sodick Co., Ltd.), Feb. 15, 1991.
Patent Abstracts of Japan, vol. 14, No. 495 (M–1041), Oct. 29, 1990, & JP–A–02 202416 (Sodick Co. Ltd.), Aug. 10, 1990.
Patent Abstracts of Japan, vol. 14, No. 495 (M–1041), Oct. 29, 1990, & JP–A–02 202420 (Sodick Co. Ltd.), Aug. 10, 1990.

*Primary Examiner*—Tim Heitbrink
*Attorney, Agent, or Firm*—Weingarten, Schurgin, Gagnebin & Hayes LLP

[57] ABSTRACT

A preplasticizing type injection apparatus having an injection cylinder internally provided with an injection plunger and a plasticizing cylinder provided in the inside with a plasticizing screw or plunger, the injection and plasticizing cylinders being arranged in juxtaposition and held in communication with each other by way of a resin conduit connecting an inlet path of the injection cylinder arranged at the front end thereof and defining the limit of advancement of the plunger and an outlet path of the plasticizing cylinder arranged at the front end thereof so that a front end portion of the injection cylinder is charged with resin molten in the plasticizing cylinder and the resin in the front end portion of the injection cylinder is injected into a mold by the plunger, characterized in that the resin conduit is realized in the form of a small metal pipe having an inner diameter between 5 and 10 mm and a length at least five times and preferably twenty to forty times greater than the inner diameter of the pipe and provided on the outer periphery with temperature control element is provided. With such a conduit, resin passing therethrough can be more kneaded to improve the distribution of heat and plasticity before it gets to the injection cylinder.

6 Claims, 6 Drawing Sheets

U.S. PATENT DOCUMENTS

| | | | |
|---|---|---|---|
| 4,734,243 | 3/1988 | Kohama et al. | 264/328.8 |
| 4,746,478 | 5/1988 | Fujisaki et al. | 425/205 |
| 4,946,356 | 8/1990 | Kumazaki | 425/587 |
| 5,256,187 | 10/1993 | Niimi et al. | 425/205 |
| 5,366,366 | 11/1994 | Yokohama | 425/561 |
| 5,499,915 | 3/1996 | Fujita | 425/557 |

FOREIGN PATENT DOCUMENTS

| | | | |
|---|---|---|---|
| 2318025 | 2/1977 | France . | |
| 2349424 | 11/1977 | France . | |
| 2549770 | 2/1985 | France . | |
| 1185809 | 1/1965 | Germany . | |
| 1814764 | 6/1970 | Germany . | |
| 2049991 | 4/1971 | Germany . | |
| 1932437 | 7/1971 | Germany . | |
| 4305202 | 8/1993 | Germany . | |
| 57-87340 | 5/1982 | Japan | 425/561 |
| 63-47116 | 2/1986 | Japan | 425/587 |
| 2-52717 | 2/1990 | Japan | 425/587 |
| 3-766616 | 4/1991 | Japan | 425/587 |
| 3-97517 | 4/1991 | Japan | 425/587 |
| 392059 | 9/1965 | Switzerland . | |
| 837579 | 6/1960 | United Kingdom . | |
| 1166061 | 10/1969 | United Kingdom . | |
| WO9411174 | 5/1994 | WIPO . | |

PREPLASTICIZING INJECTION APPARATUS

This application is a continuation of application Ser. No. 08/405,349, filed Mar. 16, 1995 now abandoned.

BACKGROUND OF THE INVENTION

1. Field of the Invention

This invention relates to a preplasticizing type injection apparatus for injecting resin into a mold by means of a plunger after melting and kneading (plasticizing) resin in a plasticizing cylinder and charging an injection cylinder with a given amount of plasticized resin.

2. Background Art

A conventional preplasticizing type injection apparatus typically comprises an injection cylinder internally provided with an injection plunger and a plasticizing cylinder provided in the inside with a plasticizing device such as a screw or a plunger, said injection and plasticizing cylinders being arranged in juxtaposition and held in communication with each other by way of a resin conduit connecting the front ends of the cylinders.

With such a preplasticizing type injection apparatus, resin is plasticized in the plasticizing cylinder and a given amount of molten resin is transferred from the plasticizing cylinder to the injection cylinder by way of the resin conduit connecting the front ends of the cylinders to charge the injection cylinder with the resin, which is then injected into a mold as a plunger in the injection cylinder moves forward from its retracted position.

SUMMARY OF THE INVENTION

However, known preplasticizing type injection apparatuses are accompanied by a number of problems.

Firstly, as the injection cylinder is charged with resin, the latter is apt to show an uneven distribution of heat and plasticity.

In a conventional apparatus of the type under consideration, the resin conduit is typically realized in the form of a short pipe having a large diameter so that the plasticized resin in the plasticizing cylinder may be quickly transferred to the injection cylinder with a minimum level of resistance against the flow of plasticized resin.

While a preplasticizing type injection apparatus is believed to be advantageous over an in-line screw type injection apparatus designed to plasticize resin by means of a rotating and backwardly moving screw particularly in terms of the performance of evenly plasticizing resin, the degree of even plasticization achieved by the former apparatus is not satisfactory as the temperature control means of the plasticizing cylinder and the internal screw, if such a screw is provided, do not always operate optimally to produce evenly plasticized resin because of certain reasons probably attributable to the design, material and other aspects of the components. Particularly because resin is a poor thermal conductor, any improvement in the thermal distribution of the resin flowing through the resin conduit cannot be expected before it gets to the injection cylinder if it is tumbled and mixed on the way.

While the problem of uneven plasticity distribution may be improved to a certain extent by arranging a mixing device at the front end of the injection cylinder, such a device can by turn increase the resistance against the flow of plasticized resin within the cylinder to reduce the pressure under which resin is injected into the mold. If the pressure for resin injection is raised to compensate the loss, the resin passing the mixing device can become abnormally heated by friction.

Thus, it is a first object of the invention to pride an injection apparatus comprising an improved resin conduit connecting the plasticizing cylinder and the injection cylinder of the apparatus that can solve the problem of uneven distribution of heat and plasticity within the resin contained in the plasticizing cylinder.

According to a first aspect of the invention, the above object is achieved by providing a preplasticizing type injection apparatus comprising an injection cylinder internally provided with an injection plunger and a plasticizing cylinder provided in the inside with a plasticizing screw or plunger, said injection and plasticizing cylinders being arranged in juxtaposition and held in communication with each other by way of a resin conduit connecting an inlet path of the injection cylinder arranged at the front end thereof and defining the limit of advancement of the plunger and an outlet path of the plasticizing cylinder arranged at the front end thereof so that a front end portion of the injection cylinder is charged with resin molten in the plasticizing cylinder and the resin in the front end portion of the injection cylinder is injected into a mold by means of the plunger, wherein the resin conduit is realized in the form of a small metal pipe having an inner diameter between 5 and 10 mm and a length at least five times and preferably twenty to forty times greater than the inner diameter of the pipe. With the use of such a conduit, the flow of resin passing through it encounters a high resistance given rise to by the narrow and long conduit so that consequently the resin is kneaded for another time within the conduit to improve the distribution of heat and plasticity before it gets to the injection cylinder.

If, however, the inner diameter of the resin conduit is less than 5 mm, the resistance of the conduit against the flow of plasticized resin will become too large to charge the injection cylinder with resin within a technically feasible duration of time. If, on the other hand, the inner diameter of the resin conduit is greater than 10 mm, the resistance of the conduit against the flow of plasticized resin will become too small to improve the thermal distribution of the resin passing therethrough if a longer conduit is used.

An improved thermal distribution is effectively achieved for plasticized resin by arranging temperature control means along the outer periphery of the narrow resin conduit. A band heater or a composite device realized by arranging a band heater on a coolant jacket may be used for such temperature control means.

Temperature control means simply comprising a band heater can effectively maintain the resin flowing through the resin conduit to plasticizing temperature as heat is securely transmitted to the very center of the resin in the resin conduit within a very short time to realize an even thermal distribution because of the small diameter of the conduit.

A composite device as referred to above comprises a coolant jacket fitted to the outer periphery of the resin conduit and a band heater laid on the jacket to surround the latter. Such a composite device is highly effective as temperature control means when resin is injected at temperature lower than the temperature at which it is plasticized. While it is rather difficult for a coolant jacket to control the resin temperature of an injection apparatus of the type under consideration such that resin is injected at temperature lower than the plasticizing point of the resin, the resin temperature can easily be raised to a predetermined injection temperature if the coolant jacket is heated by a band heater. Thus, with such a composite device, the resin in the plasticizing cylinder can be appropriately controlled for temperature before it is transferred to the injection cylinder.

The thermal distribution of the resin passing through the resin conduit can be further improved and the resin will be kneaded even further if a mixing device is arranged in the resin conduit. With the arrangement of a mixing device, the resin is whipped and mixed well so that it is fully plasticized before it is moved into the injection cylinder.

A mixing device that can be suitably used for the purpose of the invention may be selected from commercially available devices of different types including those comprising a number of twisted ribbon-like metal strips arranged in different directions and laid in layers to form a multi-layer structure and those comprising a number of crosses of metal strips arranged in different directions and laid in layers also to form a multi-layer structure. Since different mixing devices can be selectively used for the purpose of the invention depending on the type of the resin to be mixed and injected, a same and single screw device can be used for the injection apparatus regardless of the type of resin to be injected.

Secondly, known preplasticizing type injection apparatuses have a problem that the injection cylinder cannot always be charged accurately with a predetermined amount of resin.

In a preplasticizing type injection apparatus, the resin being poured into the injection cylinder can be partly driven back into the plasticizing cylinder by the injection pressure of the apparatus to reduce the final resin content of the injection cylinder so that eventually only an insufficient amount of resin is injected into the mold.

Conventionally, this problem is addressed in two different ways. One is the use of a valve system comprising a valve, an externally arranged spring for constantly and resiliently urging the rear side of the valve by way of a movable pin and a valve seat arranged near the plasticizing cylinder in the resin conduit such that the valve can be opened only by resin pressure applied thereto from the side of the plasticizing cylinder to prevent a back flow of resin from taking place and the other is the use of a screw system comprising a screw that is designed to advance forward until the front end of the plasticizing cylinder is closed by the screw once the injection cylinder is charged with resin. With either of the above described systems, the operation of blocking the resin back flow is initiated as soon as a resin injection cycle is started.

On the other hand, however, in a preplasticizing type injection apparatus where resin is plasticized by means of an advancing or rotating plasticizing device it comprises, resin can continue to flow into the injection cylinder if the operation of the plasticizing device is stopped. More specifically, resin having an amount of about 10% on basis of an amount of resin to be charged can flow into the injection cylinder if the plasticizing device is a screw having a diameter of 36 mm and rotated at a rate of 100 rpm to produce a back pressure of 5 kg/cm$^2$ for general purpose polystyrene (so-called GPPS) resin.

As a matter of course, the resin that flows into the injection cylinder after the end of a plasticizing cycle proves to be something excessive to the resin to be injected in a subsequent injection cycle whose amount is by no means definable because the flow rate of the after flow of resin is not constant. This means that the injection cylinder cannot be charged with resin to an amount good for an injecting operation, taking the after flow of resin into consideration, so that the cylinder may be satisfactorily charged with resin when the after flow is over. The net result is fluctuations in the amount of resin injected from the injection cylinder and a high yield of defective molded products particularly when a high degree of precision is required for the product.

It is therefore a second object of the invention to provide a preplasticizing type injection apparatus equipped with a check valve that can effectively be used to block a back flow of resin and, at the same time, to prevent an after flow of resin from occurring once a plasticizing cycle is over so that the injection cylinder may be protected against excessive charges and guaranteed for an even and stable charge.

According to a second aspect of the invention, the above object is achieved by providing a preplasticizing type injection apparatus having a configuration as defined above by referring to the first aspect of the invention, wherein it further comprises a check valve arranged at the front end of the plasticizing cylinder, the plasticizing screw being rotatably and axially movably arranged in the plasticizing cylinder of the apparatus with its front end fitted to the check valve and an annular valve seat disposed vis-a-vis the rear side of the check valve in the cylinder.

The check valve is realized in the form of a mushroom having a substantially conical head and a front end portion of the plasticizing cylinder where the check valve is arranged is provided with a recess having a profile corresponding to that of the conical head of the check valve with a gap arranged between the valve and the wall of the recess to secure a resin flow path held in communication with the resin conduit of the apparatus, the annular valve seat being disposed vis-a-vis the rear side of the check valve in the cylinder.

With such an arrangement for blocking the flow path connecting the plasticizing and injection cylinders, the front side of the check valve has a surface area greater than that of the rear side thereof to produce a difference in the surface area, the screw can be retracted immediately after the end of a plasticizing cycle until the rear side of the valve firmly abuts the valve seat because the resin pressure applied to the valve is higher at the front side than at the rear side, or the side close to the plasticizing cylinder, after the plasticizing cycle is over if the contrary is true during the cycle so that the check valve operates to block an after flow of resin moving out of the plasticizing cylinder and, at the same time, a back flow of resin moving toward the plasticizing cylinder to constantly secure for the apparatus a predetermined amount of resin with which the injection cylinder is charged.

Thirdly, known preplasticizing type injection apparatuses are accompanied by a problem that a junction of resin flows is produced in the inside of the injection cylinder at a position opposite to the resin inlet path and the resin in the cylinder can partly fall into a stalemated state that may give rise to a problem when resin of a different type and/or a different color is to be used for the next cycle of operation.

FIG. 10 of the accompanying drawings illustrates in cross section the injection cylinder 110 and the resin conduit 112 of a conventional preplasticizing type injection apparatus, where an inlet path 111 defining the limit of advancement of the plunger is bored toward the center of the injection cylinder 110. With this arrangement, the flow of plasticized resin moving into the cylinder through the resin conduit 112 is branched into two lateral flows by the front end of the plunger located at the limit of advancement in the initial stages of the charging operation and by the resistance of the resin that has entered the cylinder in the subsequent stages of the operation until they meet together at a position opposite to the resin inlet path 111.

The resin in the cylinder is apt to fall into a stalemated condition at the junction if it is located at the bottom of the area where the limit of advancement of the plunger is found to consequently give rise to a problem of requiring a long time for removing the resin remaining there when resin of a different type and/or a different color is to be used for the next cycle of operation as the apparatus needs to be operated idly to remove the remaining resin by consuming additional energy and resin that may not be necessary if such a stalemated condition does not exist.

Therefore, a third object of the invention is to provide a preplasticizing type injection apparatus equipped with an inlet path that can effectively prevent the formation of such a junction. According to a third aspect of the invention, the above object is achieved by providing a preplasticizing type injection apparatus having a configuration as defined above by referring to the first aspect of the invention, wherein the inlet path is inclined before it gets to the inner peripheral surface of the injection cylinder at a portion located in the area of the injection cylinder where the limit of advancement of the plunger is found.

With such an arrangement, all the resin moved into the injection cylinder by way of the inclined inlet path flows in a single direction along the inner peripheral surface of the cylinder so that no flow junction is formed nor a stalemated condition is produced in the resin contained in the cylinder to consequently eliminate the problem of requiring a long time of idle operation of the apparatus for removing the resin remaining there when resin of a different type and/or a different color is to be used for the next cycle of operation so that the time required for the changeover to the use of resin of a different type and/or a different color can be minimized.

Finally, known preplasticizing type injection apparatuses have a problem that molten resin can easily flow into the clearance between the injection cylinder and the plunger.

The clearance is dimensionally so designed as to minimize the possibility with which molten resin can flow into there while allowing the plunger to smoothly move within the cylinder but still resin can flow into there in the course of repeated charging and injecting cycles.

As long as the resin that has flowed into the clearance is held in a molten state and thinly dispersed there, the sliding motion of the plunger is not particularly adversely affected by the resin. However, as the resin gets thicker and stickier, it resists the sliding motion of the plunger to reduce the pressure being applied to the resin contained in the cylinder for injection molding. Eventually the plunger and the injection cylinder can be misaligned with and scrape against each other.

A known technique proposed to eliminate the problem of resin flowing into the clearance between the plunger and the injection cylinder consists in arranging a bore through the wall of the cylinder at a rear portion of the cylinder through which the resin caught in the clearance is drawn out whenever necessary. However, this technique is effective only when the resin caught in the clearance is hot and remains in a molten state. Any solidified resin in the clearance cannot be removed with this technique.

On the other hand, the effective heating zone of the band heater of the injection cylinder containing a plunger therein of an injection apparatus of the type under consideration is rearwardly limited by the stroke of the plunger and a relatively large area is left unheated in the cylinder. So, the injection cylinder shows a thermal profile that becomes remarkably low at a rear portion of the cylinder beyond the rear end of the stroke of the plunger and this thermal profile is reflected in the temperature of the plunger. Therefore, the molten resin caught in the clearance between the plunger and the injection cylinder becomes cooled and solidified as it moves rearward so that consequently it cannot be drawn out through the bore.

It is therefore a fourth object of the present invention to provide a preplasticizing type injection apparatus capable of maintaining the resin caught in the clearance between the plunger and the injection cylinder in a molten state until it gets to the bore through which it is drawn out so that the resistance of the resin against the sliding motion of the plunger may be minimized.

According to a fourth aspect of the invention, the above object is achieved by providing a preplasticizing type injection apparatus having a configuration as defined above by referring to the first aspect of the invention, wherein the injection cylinder is provided with a bore through the wall of the cylinder for drawing out resin caught in the clearance between the cylinder and the plunger at a position behind the stroke of the plunger and also with a band heater having an effective heating zone covering the bore.

With such an arrangement, the resin caught in the clearance remains in a molten state until it gets to the bore so that it can be easily drawn out through the bore before it becomes solidified to eliminate the problem of the resistance exerted by the solidified resin in the clearance against the sliding motion of the plunger and the loss in the pressure being applied to the resin contained in the cylinder for injection molding.

Now, the present invention will be described in greater detail by referring to the accompanying drawings that illustrate preferred embodiments of the invention.

DETAILED DESCRIPTION OF THE PREFERRED EMBODIMENTS

Figure 1:
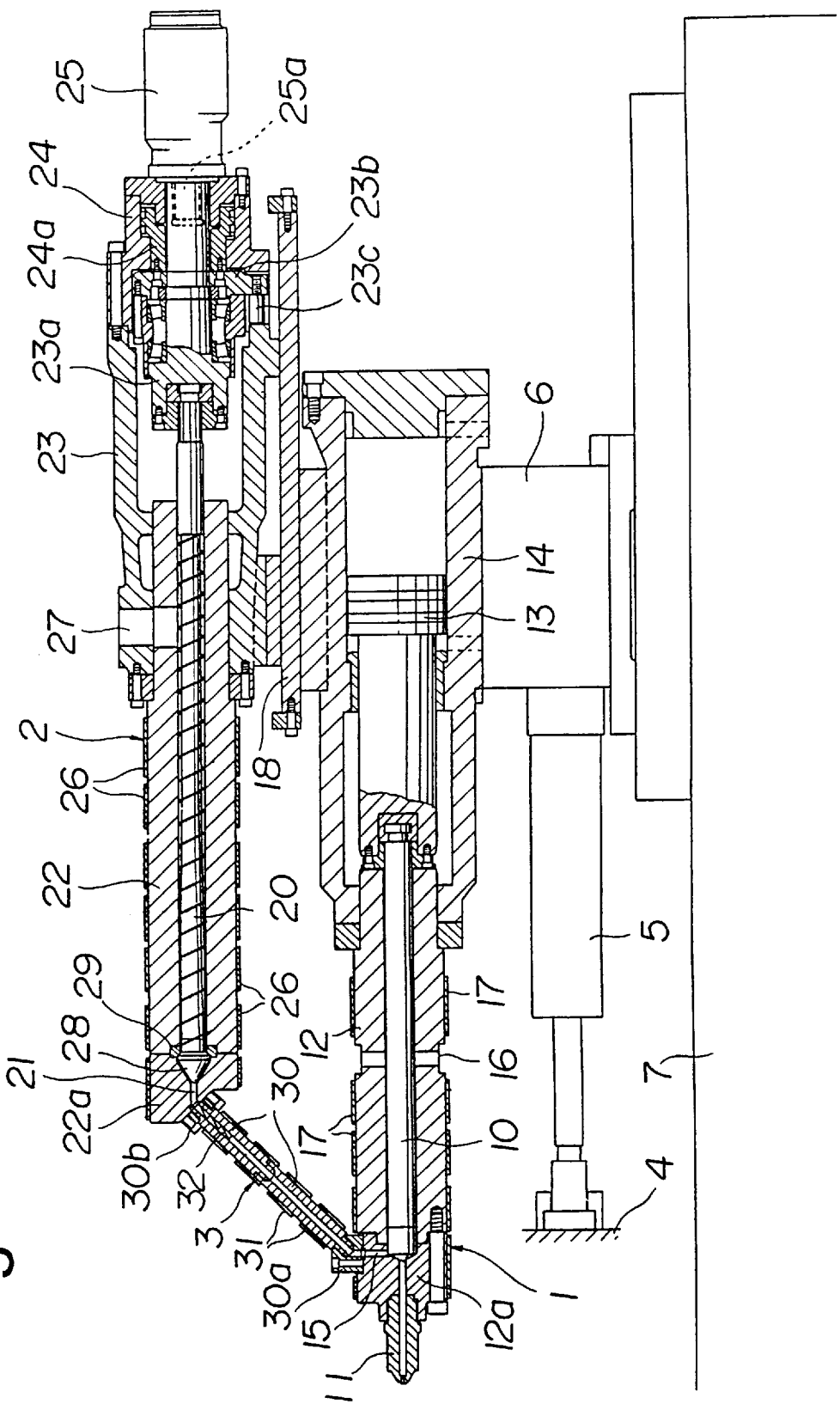
FIG. 1 is a lateral view of a preplasticizing type injection apparatus according to the invention, showing it in longitudinal cross section.

Now, the present invention will be described further by way of preferred embodiments comprising a screw as a plasticizing device.

Throughout the drawings, 1 generally denotes an injection unit and 2 denotes a plasticizing unit comprised in a pre-plasticizing type injection apparatus according to the invention and held in communication with each other by way of a resin conduit 3 connecting the front ends of the units.

The injection unit 1 comprises an injection cylinder 12 provided in the inside with an axially movable injection plunger 10 and at the front end with a nozzle 11 and a hydraulic injection cylinder 14 connected to the rear end of the injection cylinder 12 and provided in the inside with a piston 13 to drive the plunger 10.

Figure 2:
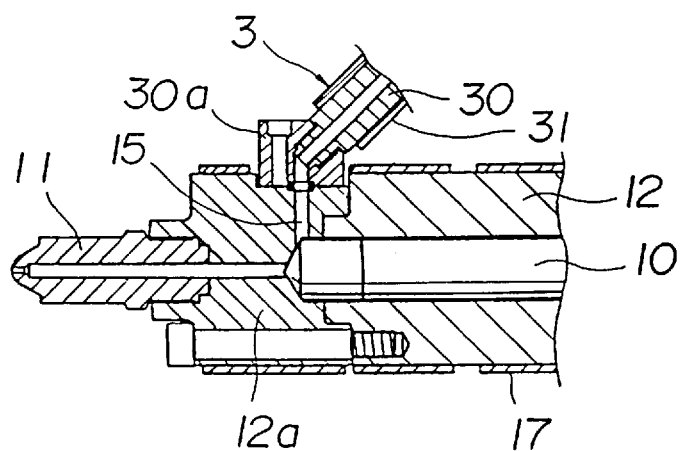
FIG. 2 is a lateral view of a front end portion of the injection cylinder of the apparatus of FIG. 1, showing it in longitudinal cross section.
Figure 3:
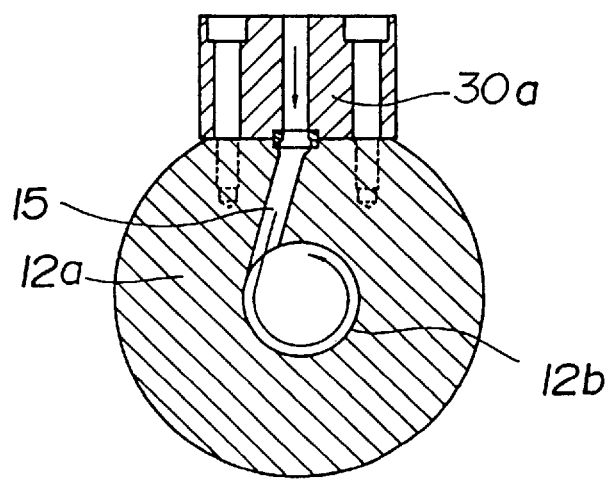
FIG. 3 is a cross sectional front view of the injection cylinder of FIG. 2, showing the inlet path thereof.

Referring to FIG. 2, the injection cylinder 12 is also provided in a front end portion 12a thereof with an inlet path 15 connected to the resin conduit 3 and arranged at a position located above the limit of advancement of the plunger, said inlet path 15 being inclined before it gets to the inner peripheral surface 12b of the injection cylinder 12 as shown in FIG. 3 so that plasticized resin flows into the cylinder in a single direction along the inner peripheral surface of the injection cylinder 12.

Figure 4:
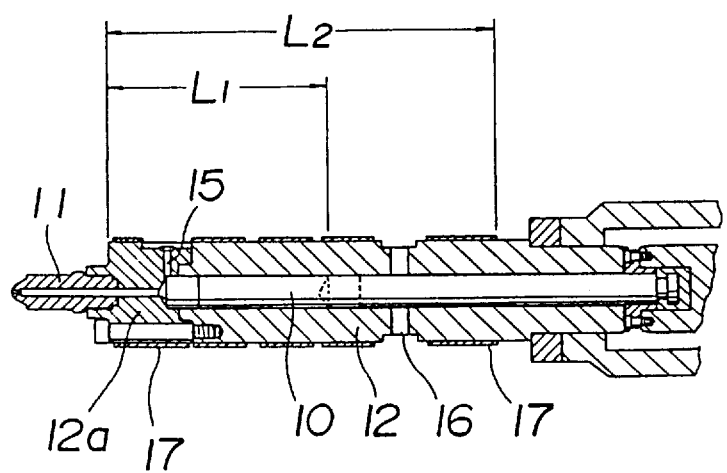
FIG. 4 is a lateral view of the injection cylinder of the apparatus of FIG. 1, showing in longitudinal cross section the stroke of the plunger and the zone covered by a band heater of the cylinder.

As shown in FIG. 4, the injection cylinder 12 is provided with a vertical through bore 16 at a position behind the stroke $L_1$ of the plunger, said bore 16 passing through the clearance between the injection cylinder and the plunger for drawing out the resin caught in the clearance and operating also as an exhaust hole. A band heater 17 is arranged around the injection cylinder to produce a large heating zone having a length $L_2$ longer than the stroke $L_1$ of the plunger and extending beyond the bore 16. It will be understood that the temperature of the injection cylinder of this apparatus can be held high if compared with a conventional apparatus having a heating zone whose length is substantially equal to the stroke of the plunger.

On the other hand, the plasticizing unit 2 comprises a plasticizing cylinder 22 provided in the inside with a plasticizing screw 20 and at the front end with an outlet path 21, a holder cylinder 23 for securely holding the rear end of the plasticizing cylinder 22, a hydraulic cylinder 24 connected to the rear end of the holder cylinder 23 for moving the screw back and forth and a drive motor 25 fitted to the rear end of the hydraulic cylinder 24 for driving the screw 20 to rotate.

The drive motor 25 has a drive shaft 25a linked with a rotary shaft 23a of the holder cylinder 23 rearwardly extending through the piston 24a of the hydraulic cylinder 24 and axially movably held in the inside of the holder cylinder 23. The rotary shaft 23a is linked at the front end with the rear end of the screw 20a and also with the piston 24a with a member 23b interposed therebetween in such a manner that the rotary shaft 23a is only axially movable with the piston 24a to drive the screw 20 to move back and forth. A stopper 23c is fitted to the member 23b to limit the axial movement of the screw 20.

The plasticizing cylinder 22 is provided on the outer periphery thereof with a band heater 26 and at a rear portion connecting itself to the holder cylinder 23 with an upwardly extending feed bore 27.

Figure 5:
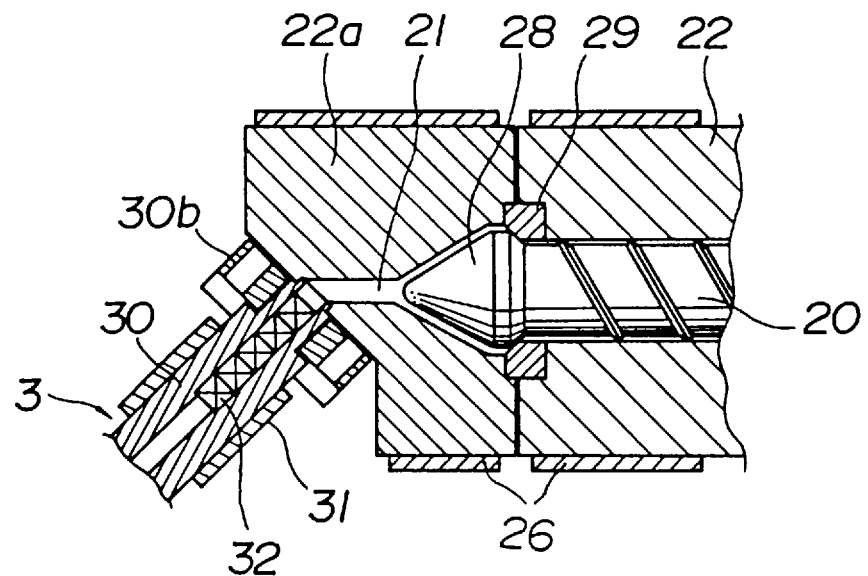
FIG. 5 is a lateral sectional partial view of the plasticizing cylinder of the apparatus of FIG. 1, showing the cylinder and the resin conduit when the valve of the latter is closed.
Figure 6:
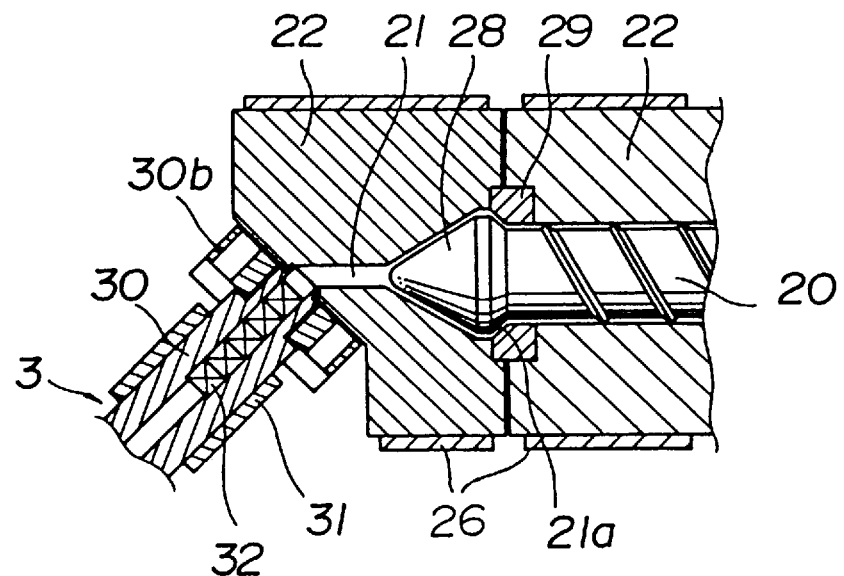
FIG. 6 is a lateral partial view similar to FIG. 5, showing partly the cylinder and the resin conduit when the valve of the latter is open.

As seen from FIGS. 5 and 6, the screw 20 is provided at the front end with a mushroom-shaped check valve 28 having a conical head. The plasticizing cylinder 22 is provided in a front end portion thereof with a recess having a profile corresponding to that of the head of the check valve for receiving the head with a flow path surrounding the check valve and held in communication with the outlet path 21. An annular valve seat 29 is also arranged in the plasticizing cylinder 22 to abut the inclined rear side of the head of the check valve 28.

Although the flow path has a configuration that varies depending on the type of resin to be injected, it comprises a clearance 21a sized at least 1.0 to 1.5 mm between the check valve 28 and the valve seal 29 and also a sufficiently large clearance between the check valve 28 and the wall surface of the recess if the check valve 28 has a diameter of 36 mm. Heat can be generated by friction within the plasticizing cylinder if the clearance 21a is less than 0.5 mm, whereas it will take too much time for closing the valve to effectively block a back flow of the resin contained in the cylinder if the clearance 21a is greater than 2.0 mm.

The resin conduit 3 comprises a narrow metal pipe 30 having an inner diameter of 5 to 10 mm and provided on the outer periphery thereof with a band heater 31 and in an upper portion with an appropriate mixing device 32. The metal pipe 30 is arranged aslant between the inlet path 15 of the injection cylinder 12 and the outlet path 21 of the plasticizing cylinder 22 and secured thereto by means of joints 30a, 30b respectively.

The mixing device 32 may be selected from commercially available devices of different types including those comprising a number of twisted ribbon-like metal strips arranged in different directions and laid in layers to form a multi-layer structure and those comprising a number of crosses of metal strips arranged in different directions and laid in layers also to form a multi-layer structure. Since different mixing devices can be selectively used for the purpose of the invention depending on the type of the resin to be mixed and injected, a same and single plasticizing screw 20 can be used for the injection apparatus regardless of the type of resin to be injected.

The injection unit 1 and the plasticizing unit 2 are arranged in vertical juxtaposition with the holder cylinder 23 secured to a support table 18 arranged on the injection cylinder 12 while the hydraulic cylinder 14 of the injection unit 1 is anchored to a slidable base block 6 connected to a fixed panel 4 of a mold fastener via a nozzle touch cylinder 5. Then, the entire injection apparatus is mounted on a base 7.

A preplasticizing type injection apparatus having a configuration as described above operates in a following manner.

As hydraulic fluid is supplied to the back chamber side of the hydraulic cylinder 24, the screw 20 is moved forward (1.0 mm) along with the piston 24a and the rotary shaft 23a to separate the inclined rear side of the check valve 28 from the valve seat 29 and open the valve. At about the same time, the screw 20 is rotated with the rotary shaft 23a by the drive motor 25 to plasticize the resin that has been fed into the plasticizing cylinder 22 through the feed bore 27 and the plasticized resin is gradually pushed forward to flow into the resin conduit 3 through the clearance between the check valve 28 and the valve seat 29 and the outlet path 21 linked with the clearance.

In the resin conduit 3, plasticized resin is whipped and kneaded by the mixing device 32 to increase the plasticity and improve the distribution of color until it is finally poured into the inlet path 15 of the injection cylinder 12 so that the resin shows an enhanced level of homogeneity if compared with resin that has been plasticized only by a screw 20. It would be understood that, if the mixing device were arranged in the flow path of the front end portion 12a of the injection cylinder 12 and not in the resin conduit 3, the loss in the pressure applied to the resin passing there-through for injection would be significant because of the resistance of the mixing device and heat would be generated there. However, since a mixing device 32 is actually arranged in the resin conduit 3 to kneaded the resin in the conduit before it is moved into the injection cylinder 12, the resistance of the mixing device exerted to the resin is negligible regardless of the resistance of the mixing device. Consequently, the injection pressure does not need to be made high to offset the pressure loss induced by the resistance of the mixing device 32.

The resin kneaded by the mixing device 32 is then made to flow into the injection cylinder 12 through the inclined inlet path 15 of the injection cylinder 12 to apply pressure to the front end of the plunger 10 and force it to retreat to a predetermined position so that the front end of the injection cylinder 12 is charged with resin to terminate the charging cycle of the operation.

During the charging cycle, resin flows into the injection cylinder 12 through the inclined inlet path 15 and along the inner peripheral surface 12a of the injection cylinder 12 in one direction. The flow of resin is then directed backward from the inlet path 15 like a horizontal vortex as the plunger 10 retreats under the pressure of the incoming resin. Thus, the flow of resin is not branched into two flows and no junction of branched flows is formed in the cylinder at a position opposite to the inlet path as in the case of a vertically arranged inlet path of a conventional injection apparatus. Consequently no stalemated condition is produced in the injection cylinder.

As the plunger 10 gets to an end position to terminate a charging cycle, the screw 20 stops rotating and the operation of plasticizing resin is temporarily suspended. Immediately after the temporary suspension of the plasticizing operation, hydraulic fluid is supplied to the front chamber of the hydraulic cylinder 24 to force the screw 20 to retreat. As a result, the check valve 28 is strongly pressed against the valve seat 29 at the inclined back side to close the valve and the front end of the plasticizing cylinder 22 is blocked to interrupt the flow of resin so that no resin can flow into the injection cylinder side once the screw 20 stops rotating.

Since the valve is closed as the screw 20 retreats, the resin staying in front of the valve is not pushed forward and hence the plunger 20 is made to securely stop at a predetermined position. Therefore, a predetermined amount of resin is always stored in front of the plunger of the injection cylinder 12 in each charging cycle.

If the back pressure applied to the resin staying in front of the check valve 28 is too high, resin can keep flowing into the injection cylinder under the residual resin pressure to give rise to an excessively charged status in the injection cylinder after the check valve 28 is closed. However, such a phenomenon can be prevented by sensing the position of the plunger 10 after the screw stops rotating and closing the check valve 28 exactly in a manner as described above, using the sensed position for terminating the charging cycle.

Alternatively, if such is the case, the plasticizing operation may be terminated when the plunger 10 retreats to a position where the rotation of the screw is also stopped, said position being predetermined by referring to the normal position for terminating the charging cycle by the plunger 10. Thereafter, the injection cylinder keeps being charged with resin under the residual resin pressure until the plunger 10 gets to the normal position for terminating the charging cycle, when the screw 20 is made to retreat to close the valve and terminate a charging cycle.

When the charging cycle is terminated, the plunger 10 starts injecting the resin in the injection cylinder into a mold. As the plunger 10 is made to advance while the valve 28 is closed, the resin in the injection cylinder is forced out into a mold (not shown) through the nozzle 11 of the injection cylinder. The pressure applied to the resin by the plunger 10 for injection also acts on the plasticizing cylinder by way of the resin remaining in the resin conduit 3. However, because the check valve 28 is closed, no resin is forced to flow back into the plasticizing cylinder and all the resin that has been stored in the injection cylinder is forced out through the nozzle 11.

As the injection cycle is completed, the screw 20 is made to advance by the hydraulic cylinder 14 to start a new charging cycle as it is rotated by the drive motor 25.

In an experiment, a conventional apparatus designed to close the check valve at the start of an injection cycle and an apparatus according to the invention designed to close the check valve immediately after the screw stops rotating were compared for the variances in the terminal position of the plunger and the weight of the injected resin. The table below shows the results of the experiments.

As seen from the table, when the check valve is closed immediately after the screw stops rotating as in the case of an injection apparatus according to the invention, the plunger comes to its terminal position on a stable basis to minimize the variance in the weight of the resin to be charged in each charging cycle and the check valve effectively blocks a back flow of resin into the plasticizing cylinder side in each injection cycle so that the weight of the resin injected in each injection cycle is subject to a minimum level of deviation so that the occurrence of defective products is minimized.

|  |  | Plunger Terminal Position | Variance | Variance in Weight |
| --- | --- | --- | --- | --- |
| Apparatus of the Present Invention | Actual Value Average Deviation | 20.26~20.29 mm | 0.03 mm 0.0171 | 0.0445 g 0.01262 |
| Conventional Apparatus | Actual Value Average Deviation | 22.25~22.83 mm | 0.57 mm 0.14967 | 0.374 g 0.0746 |

N.B. designed plunger terminal position: 20.0 mm,
resin type: GPPS,
plasticizing screw diameter: 36.0 mm,
injection plunger diameter: 36.0 mm.

Even when the injection cylinder has to be charged with resin under high back pressure, the apparatus does not require any modification and the plunger of the injection cylinder can be made to stop at a predetermined terminal position on a stable basis by closing the check valve after the plasticizing cycle. Thus, the injection cylinder can always be charged accurately with a predetermined amount of resin regardless of the type of resin and the parameters for plasticization involved.

As the plunger is axially moved for the charging and injection cycles, resin can flow into the clearance between the injection cylinder and the plunger 10 and then gradually moved rearward in the cylinder. However, the resin is not solidified on the way and safely drawn out of the injection cylinder through the bore 16 because the effective heating zone $L_2$ is longer than the stroke $L_1$ of the plunger 10 and the hole 16 is covered by a rear portion of the heating zone $L_2$.

Additionally due to the fact that the heating zone $L_2$ exceeds the stroke $L_1$ of the plunger 10, the plunger 10 is kept to temperature higher than the plunger temperature of a comparable conventional apparatus so that the temperature of the portion of the injection cylinder charged with resin and hence that of the resin contained therein are stabilized.

Consequently, the resistance against the sliding movement of the plunger and the pressure loss in the injection cylinder that are attributable to the solidified resin remaining in the clearance between the cylinder and the plunger can be minimized and resin can be drawn out of the cylinder very easily to eliminate any possible stalemated condition of resin so that the plunger is practically kept free from any possible adverse effects of the resin remaining in the clearance between the plunger and the injection cylinder such as misalignment and consequent mutual biting of the plunger and the injection cylinder and a resin-clogged clearance. Gas that may be remaining in the clearance can also be extracted through the bore 16.

Figure 7:
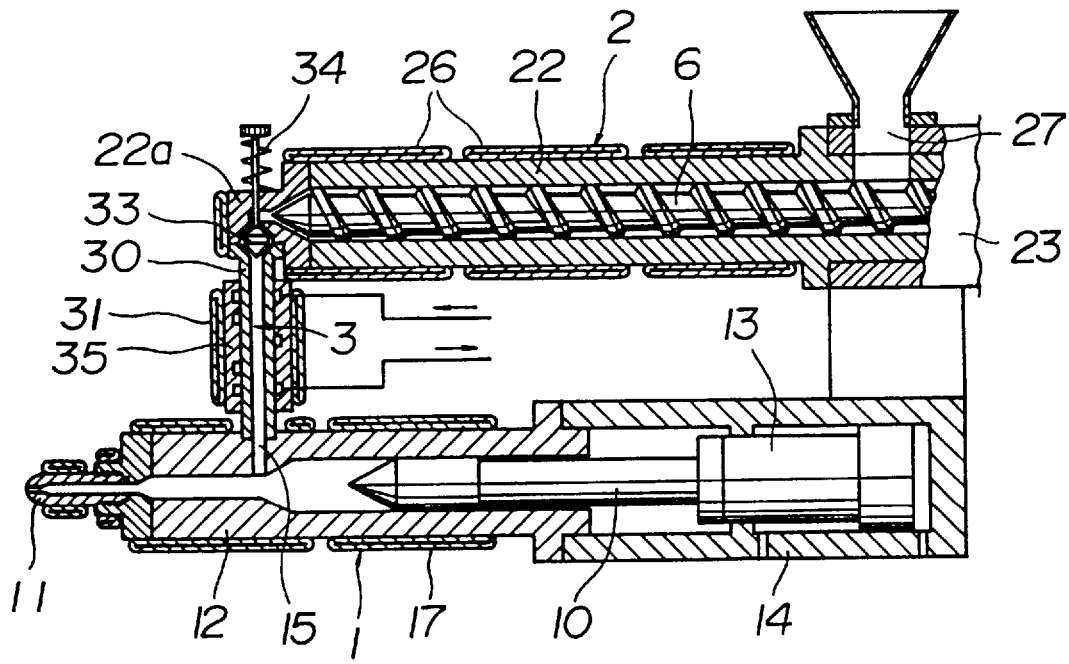
FIG. 7 is a lateral of another embodiment of preplasticizing type injection apparatus according to the invention that is provided with a composite temperature control device, showing in longitudinal cross section the apparatus without the drive section thereof.
Figure 8:
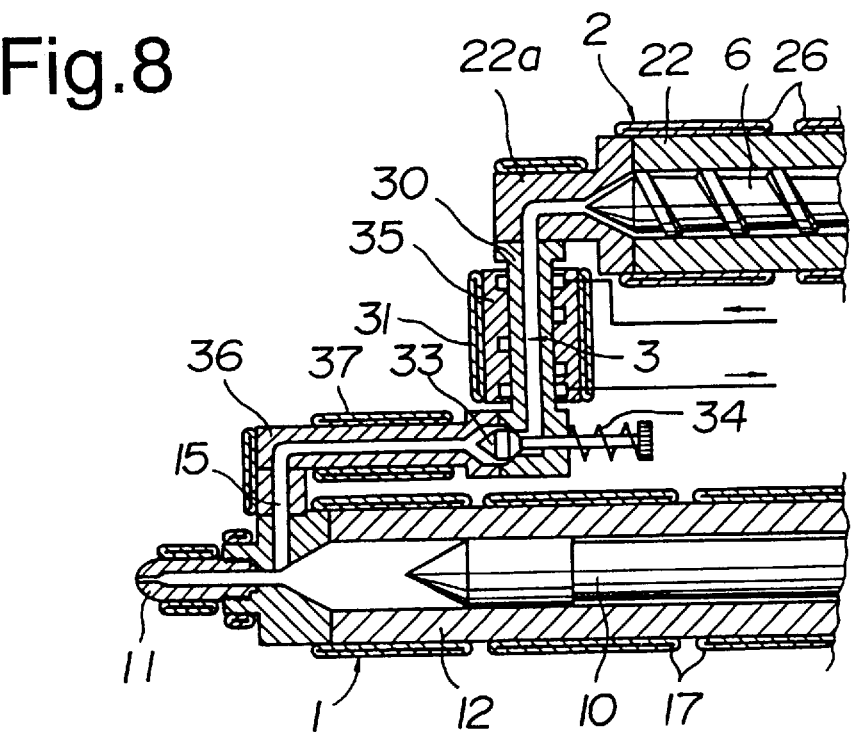
FIG. 8 is a lateral sectional view similar to FIG. 7, showing still another embodiment of preplasticizing type injection apparatus provided with a composite temperature control device comprising a band heater.

FIGS. 7 and 8 illustrate two other embodiments of the invention having a resin conduit 3 different from that of the above described embodiment.

The resin conduit 3 comprises a small steel pipe 30 having an inner diameter of 8 mm and a length of 250 mm (31 times as large as the inner diameter).

The small steel pipe 30 of FIG. 7 is arranged vertically and connect the front end 22*a* of the 1 22 and a front end portion 12*a* of the injection cylinder 12. Said front end 22*a* is provided in the inside with a check valve 33 for opening and closing the outlet path of the plasticizing cylinder 22, said check valve 33 being constantly urged toward the closed position by a spring member 34. The small steel pipe 30 is provided around its outer periphery with composite temperature control means comprising a coolant jacket 35 and a band heater 31 arranged around the coolant jacket in order to cool and improve the thermal profile of the molten resin flowing through the resin conduit 3.

The resin conduit 3 of FIG. 8 comprises a vertically disposed small steel pipe 30 and a horizontally arranged small pipe 36 connected to the pipe 30. The horizontal small pipe 36 is provided on the outer periphery with a band heater 37 for reheating the resin running therethrough and a check valve 33 is arranged at the junction of the two small pipes. With this arrangement, since the molten resin passing through the resin conduit 3 can be supplementarily heated, it operates for temperature control better than a resin conduit provided only with a coolant jacket.

In any of the above described embodiments, resin is plasticized in the plasticizing cylinder 22 heated to relatively high temperature if compared with a conventional injection apparatus so that, if the resin contains cooled portions therein, they are warmed to desired temperature before moved into the injection cylinder.

The temperature control means is designed to cool the resin conduit 3 to temperature lower than the plasticizing temperature so that the molten resin passing therethrough may show a predetermined temperature that is good for injection. Such a predetermined temperature can be obtained by using both the coolant jacket 35 and the band heater 31 and operating them appropriately. The resin flowing through the resin conduit 3 encounters resistance of the resin conduit 3 with a reduced diameter that is as small as 8 mm and a long stretch so that the uneven thermal profile of the resin, if any, is improved as it passes through the resin conduit 3. Additionally, the resin is cooled down to the very center by the coolant jacket 35 or the band heater 31 to temperature good for injection before it is moved into the injection cylinder 22.

The plasticizing temperature, the predetermined temperature to be achieved by the temperature control means for the resin passing through the resin conduit and the temperature of molten resin are shown below for various types of resin.

| Resin Type | Plasticizing Temp. (°C.) | Predetermined Temp. (°C.) | Injection Temp. (°C.) |
|---|---|---|---|
| PMMA | 260 | 240 | 245.7 |
| ABS | 240 | 230 | 235.6 |
| PA6-6 | 280 | 265 | 272.4 |
| PPS | 330 | 315 | 318.2 |

Figure 9:
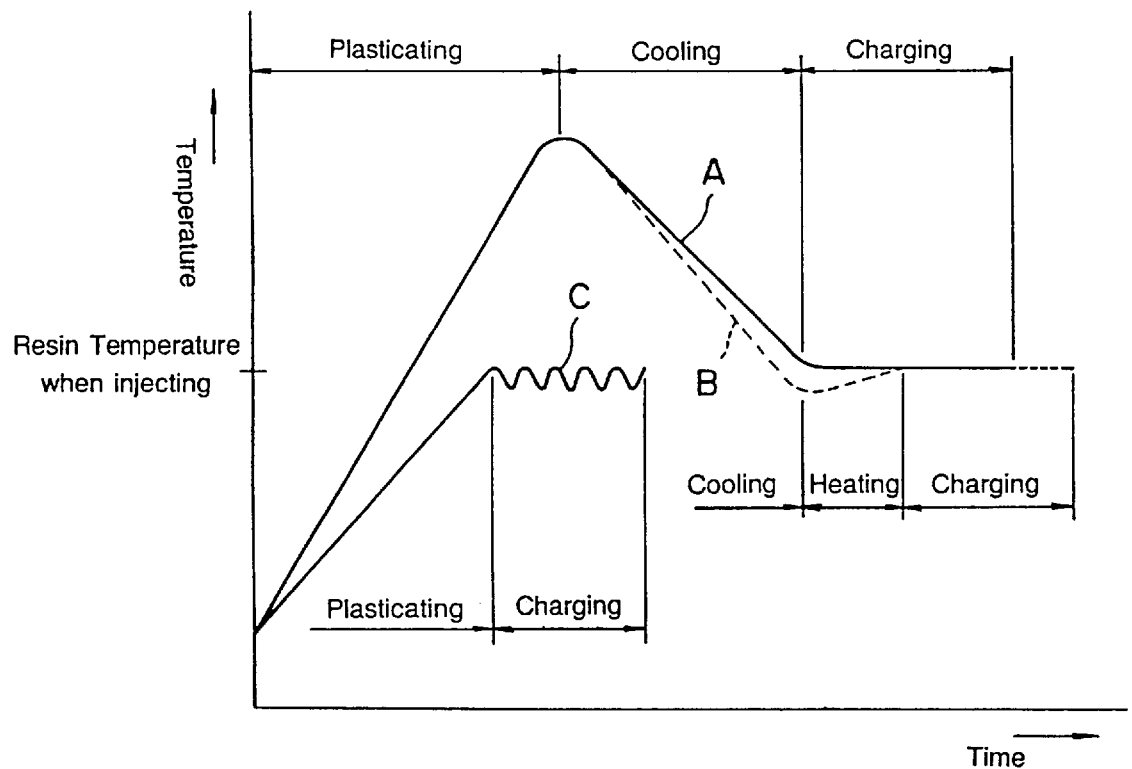
FIG. 9 is a graph showing the change with time of the resin temperature in an operation cycle of the embodiment of FIGS. 7 and 8 and that of an apparatus using a conventional resin conduit.
Figure 10:
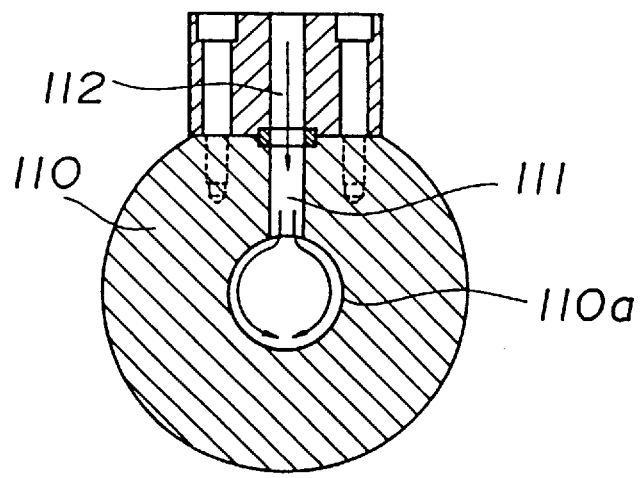
FIG. 10 is a cross sectional front view of the injection cylinder of a conventional preplasticizing type injection apparatus, showing the inlet path thereof.

FIG. 9 is a graph showing the relationship between the resin temperature and the elapse of time for two preplasticizing type injection apparatuses according to the invention and a comparable conventional preplasticizing type injection apparatus. In FIG. 9, A and B denote the curves for the embodiments of FIGS. 7 and 8 respectively, while C denotes the curve for the conventional apparatus.

As clearly seen from the graph, neither A nor B do not show any fluctuations in the temperature of the molten resin filled in the injection cylinder, whereas C represents remarkable fluctuations in the resin temperature that may reflect an uneven thermal distribution in the molten resin.

It has been found that the resistance of the resin conduit 3 against molten resin is too large and too much time is required for resin to be filled in the cylinder when the diameter of the resin conduit 3 is less than 5 mm, whereas the resistance of the resin conduit 3 is too small to improve the thermal profile of the resin filled in the cylinder when the diameter of the resin conduit 3 is greater than 10 mm if the conduit is made relatively long.

When the resin conduit is provided with means for controlling the temperature of the molten resin passing there-through, not only the thermal profile of the resin filled in the injection cylinder is improved because of the resistance of the resin conduit but also the molten resin can be injected at controlled temperature. Consequently, a satisfactory temperature control is achieved for molten resin by an apparatus according to the invention if compared with any conventional apparatuses.

The fact that an injection apparatus according to the invention can improve the thermal profile of molten resin and hence relieve molded resin products from stress makes it particularly suited for manufacturing precision products such as thick lenses, prisms and other optical products as well as other precision items.

While resin is plasticized by means of a rotating screw in any of the above embodiments, the operation of plasticizing resin can alternatively be carried out by means of a plunger. Similarly, the arrangement of the resin conduit 3, the inlet path 15, the bore 6 for drawing out residual resin and other components can be modified within the scope of the present invention. Additionally, the concept of the present invention can be applied to not only preplasticizing type injection apparatuses but also apparatuses of other types.

What is claimed is:

1. A preplasticizing injection apparatus comprising an injection cylinder internally provided with an injection plunger and a plasticizing cylinder provided in the inside with an element selected from the group consisting of a screw and a plunger, said injection and plasticizing cylinders being arranged in juxtaposition and held in communication with each other by a resin conduit connecting and inlet path of the injection cylinder arranged at a front end of said injection cylinder and defining the limit of advancement of the plunger and an outlet path of the plasticizing cylinder arranged at the front end of said injection cylinder so that the front end portion of the injection cylinder is charged with molten resin in the plasticizing cylinder and the resin in the front end portion of the injection cylinder is injected into a mold by the injection plunger, wherein the injection cylinder is provided with a bore through the wall of the cylinder at a position behind the stroke of the injection plunger and with a band heater having an effective heating zone covering the bore, and wherein the bore, the heater and the injection plunger are adapted to discharge resin that gets caught in the clearance between the injection cylinder and the injection plunger out of said injection cylinder through said bore.

2. A preplasticizing injection apparatus according to claim 1, wherein said temperature control means comprises a coolant jacket and a band heater arranged on the outer periphery of the coolant jacket to form a multi-layer structure.

3. A preplasticizing injection apparatus according to claim 1, wherein said resin conduit is provided in an upper portion thereof with a mixing device for increasing the plasticity of said resin.

4. A preplasticizing injection apparatus according to claim 3 wherein said plunger of the injection cylinder further comprises a check valve arranged at the front end of the plasticizing cylinder and realized in the form of a mushroom having a substantially conical head and an inclined rear side, a front end portion of the plasticizing cylinder being provided with a recess having a profile corresponding to that of the conical head of the check valve for receiving the check valve with a gap arranged between the valve and the wall of the recess to secure a resin flow path held in communication with the resin conduit of the apparatus, and an annular valve seat disposed adjacent the inclined rear side of the check valve in the plasticizing cylinder.

5. A preplasticizing injection apparatus according to claim 4, wherein said check valve is configured to retreat with the screw immediately after the plasticizing cylinder stops operating and abut the valve seat at the inclined rear side thereof to block the resin flow path constituted by the clearance around the check valve.

6. A preplasticizing injection apparatus according to claim 4, wherein said check valve is configured to retreat for closure with the screw after the plasticizing cylinder stops operating, while monitoring the position of the injection plunger.

* * * * *